United States Patent Office 2,751,921
Patented June 26, 1956

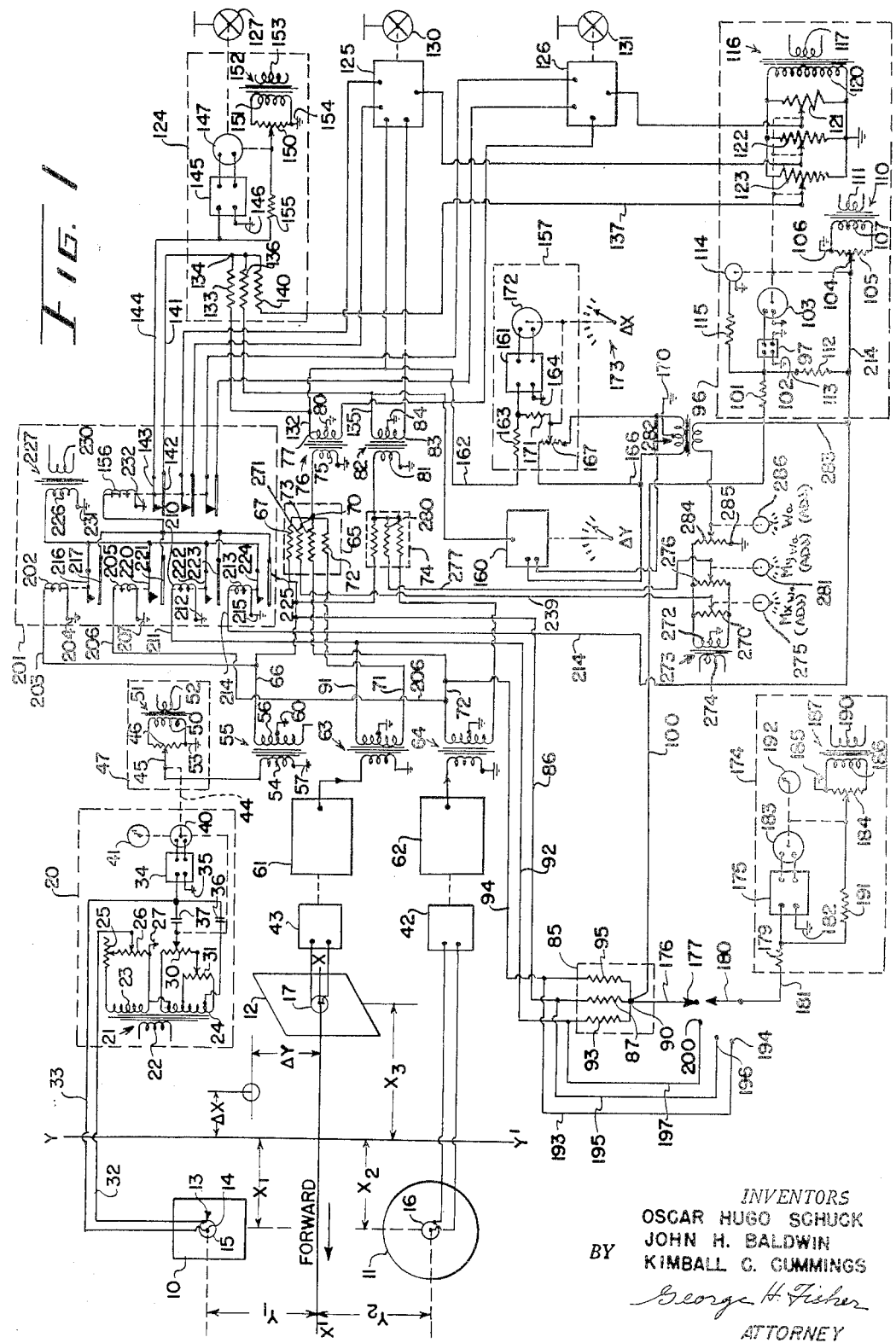

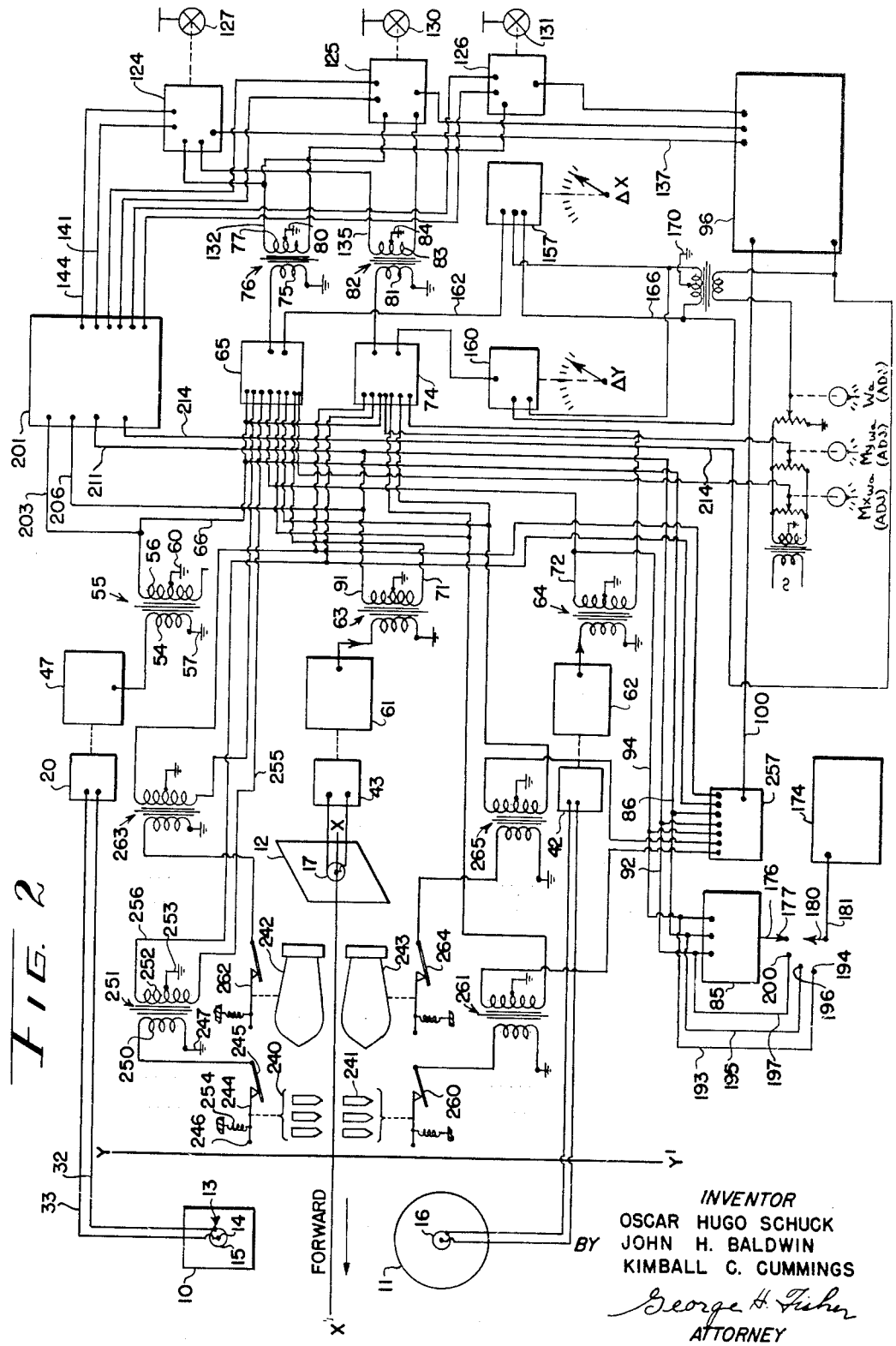

2,751,921

CONTROL APPARATUS

John H. Baldwin, Minneapolis, Kimball C. Cummings, Golden Valley, and Oscar Hugo Schuck, Minneapolis, Minn., assignors to Minneapolis-Honeywell Regulator Company, Minneapolis, Minn., a corporation of Delaware Application August 10, 1953, Serial No. 373,373

20 Claims. (Cl. 137—98)

This invention is concerned with measuring and control apparatus and particularly with apparatus for measuring and controlling the center of gravity of a number of objects, including fuel tanks, in an aircraft, ship or land vehicle.

The center of gravity of a craft is affected by all weights which are not positioned at the center of gravity and an aircraft, for example, is designed and constructed to have its weight distributed so as to have a center of gravity which shall provide the most efficient flight of the craft. However, in loading a craft it is not always possible to distribute the weight, whether in the form of passengers, baggage or freight in commercial craft, or bombs and ammunition, or possibly troops and supplies, in military craft, so that the center of gravity of the loaded craft is the same as its center of gravity when empty. Also, because of the desire to utilize all possible space the fuel tanks are often put in locations on the craft which will cause shifting of the center of gravity as they are filled and emptied.

If, however, the fuel tanks were to be drained at rates in proper predetermined relationship with respect to each other the actual center of gravity could be held close to the desired position. It is therefore an object of this invention to design apparatus for computing the center of gravity of an aircraft, including the fuel in its tanks.

Another object of the invention is to design apparatus for controlling the center of gravity of an aircraft through suitable control of the drainage rate of fuel from its fuel tanks.

A further object of the invention is to design new and improved, accurate, lightweight apparatus for computing the center of gravity of a number of objects, including fuel, put into a craft and for controlling the center of gravity of the craft by controlling the relative rates of withdrawal of fuel from the various tanks.

Another object of the invention is to design center of gravity computing and controlling apparatus sufficiently flexible to change the relative withdrawal rates of the fuel from the various tanks upon changes in the loading of the aircraft, such as dropping of bombs.

When one of the tanks becomes completely drained or the total supply of fuel gets too low it will no longer be possible, of course, for all the tanks to continue to be drained in the same relative ratio. It is therefore necessary to override the center of gravity control apparatus in order to prevent stopping of the fuel drainage from the other tanks to the engine or engines of the plane. It is therefore another object of the invention to design apparatus which will override the center of gravity control apparatus when it is no longer capable of effectively operating upon the center of gravity due to emptying of one or more of the fuel tanks or due to the total supply of fuel getting too low.

A preferred embodiment of the invention is accomplished by obtaining voltages representing the weights of the various objects such as fuel in tanks, bombs, cargo, and airframe. These voltages are applied to a first set of resistors having values inversely proportional respectively to the perpendicular displacements of the centers of gravity of the various objects from a first axis. This set of resistors comprises a first moment summing circuit. The same voltages are applied to a second set of resistors having values inversely proportional to the perpendicular distances of the centers of gravity of the various objects from a second axis, this set of resistors thereby comprising a second moment summing circuit. The same voltages are further applied to a third set of resistors, all having equal values, this set of resistors thereby comprising a weight totalizing circuit. The first and second axes are preferably at right angles to each other, with the first aligned with the lateral axis of the craft and called the Y-axis, and the second aligned parallel to the longitudinal axis of the craft and called the X-axis. The first moment summing circuit then allows deviation of longitudinal or fore and aft moment resultants, the second moment summing circuit allows deviation of lateral moment resultants. Comparison of a signal derived from the weight totalizing circuit with a signal derived from the X moment summing circuit allows deviation of the displacement of the center of gravity of the airframe and the various objects carried by it from the Y axis. Similarly, comparison of the weight total representative signal with a signal derived from the Y moment summing circuit allows determination of the displacement of the center of gravity of the airframe and the various objects carried by it from the X axis. In addition, the magnitude of the weight total representative signal forms the independent variable input to a function generator or scheduling computer, having a separate dependent output for each fuel tank. The dependent outputs of this scheduling computer are signal voltages corresponding to the weights of fuel that should be in each tank in order to keep the center of gravity in its desired position, or within an allowable range of position. For each tank, the discrepancy between the actual quantity and that required to maintain the desired position of the center of gravity operates to adjust the position of a valve in the output pipe of the tank, the sense of the adjustment being such as to increase or decrease the flow rate of fuel from that tank as needed to make the quantity of fuel in that tank tend toward its required value. When this becomes impossible, because the tank has become empty, the condition of emptiness is sensed and operates to override the normal valve control action, and either leave all valves at their then existent positions, or alternatively, to set them all to full open.

In order to provide a mathematical basis for the operation of the system just described, let the following symbols be defined:

$W_a$ = weight of aircraft without fuel in tanks
$W_1, W_2, W_3$ = weight of fuel in tanks 1, 2, 3 respectively
$\epsilon W$ = total weight of aircraft and fuel at any instant then $$\epsilon W = W_a + W_1 + W_2 + W_3$$

further, let $x_a$ = X-displacement of center of gravity of aircraft without fuel from desired X position of the center of gravity $x_1, x_2, x_3$ = displacements of centers of gravity of tanks 1, 2, 3 respectively from desired X positions of the center of gravity $\epsilon Wx$ = summation of X-moments from desired X position of center of gravity then $$\epsilon Wx = W_a x_a + W_1 x_1 + W_2 x_2 + W_3 x_3$$

further, let $\Delta x$ = X-displacement of actual center of gravity from desired X position of center of gravity then $$\Delta x = \frac{\epsilon W x}{\epsilon W}$$

Similarly defining the Y displacements, moments, and resulting displacement $$\Delta y = \frac{\epsilon W y}{\epsilon W}$$

Functions generated by the scheduling computer are $$W_1' = f_1(\epsilon W)$$
$$W_2' = f_2(\epsilon W)$$
$$W_3' = f_3(\epsilon W)$$

Here the primed W's are the respective quantities needed to maintain the actual center of gravity at, or within allowable tolerance range of, its desired position. The valve opening $V_1$ for tank 1 is then a function of the discrepancy between the actual quantity in this tank and the quantity needed, or $$V_1 = F_1'(W_1' - W_1)$$

The nature and sense of the function being determined by design of circuits and feedback functions to be corrective.

For a better understanding of the invention reference is had to the following detailed description taken in conjunction with the accompanying drawings in which:

Figure 1 is a schematic diagram of the apparatus showing only the weights of the fuel in the various tanks and weight of the craft being considered; and Figure 2 is a schematic diagram in which the weights of bombs are also considered.

In Figure 1 three tanks are shown positioned with respect to a set of coordinates X—X' and Y—Y'. The forward end of the craft is in the direction of X'. The three tanks are numbered 10, 11 and 12. A measuring device, or tank unit 13, which may utilize a capacitance principle, is preferably located along the vertical locus of the center of gravity of tank 10 from the top of the tank to the bottom. The capacitive device 13 has an inner electrode 14 and an outer electrode 15. If desired the tank unit may be characterized as is shown in the copending application to Robert D. Meyers, Serial No. 192,685, filed October 28, 1950, and assigned to the same assignee as the present invention. When the tank is empty the space between the two electrodes is filled with air or air and fuel vapor, while when the tank is full the space between the two electrodes contains fuel. Since the dielectric constant of fuel is greater than that of air by approximately two to one the capacitance of the tank unit will vary with rise and fall of fuel in the tank.

A tank unit 16 is positioned along the vertical locus of the center of gravity of tank 11 while a tank unit 17 extends along the vertical locus of the center of gravity of tank 12.

Tank unit 13 is shown to be located a distance $X_1$ forward of the Y—Y' axis and a distance $Y_1$ to the right of the X—X' axis. Tank unit 16 is located a distance $X_2$ forward of the Y—Y' axis and a distance $Y_2$ to the left of the X—X' axis. Tank unit 17 is located a distance $X_3$ aft of the Y—Y' axis and on the X—X' axis with the result that its Y coordinate is zero.

Tank unit 13 is connected into a fuel quantity measuring circuit 20 which is energized by a transformer 21 having a primary winding 22 connected to a source of alternating voltage, not shown. Transformer 21 has secondary windings 23 and 24. A rheostat resistor 25 has one terminal thereof connected to the upper end of transformer secondary winding 23. A potentiometer resistor 26 has one terminal thereof connected to the rheostat wiper arm while the other terminal of the potentiometer resistor 26 is connected to the lower terminal of transformer secondary winding 23. The second terminal of potentiometer resistor 26 is also connected to ground terminal 27.

A potentiometer resistor 30 has one terminal thereof connected to the upper end of transformer secondary winding 24 while its lower terminal is connected to a wiper arm associated with a potentiometer resistor 31. Potentiometer resistor 31 has one terminal connected to the lower end of transformer secondary winding 24 and the other terminal connected to a point intermediate the two ends of transformer secondary winding 24. Transformer secondary winding 24 is connected, near its upper end, to ground terminal 27.

The outer electrode 15 of tank unit 13 is connected to the wiper arm associated with potentiometer resistor 26 by conductor 32. The inner electrode 14 of the tank unit 13 is connected by conductor 33 to an input terminal of an amplifier 34. The other input terminal of amplifier 34 is connected to ground terminal 35. Transformer secondary winding 24 is connected near its lower terminal to the ungrounded input terminal of amplifier 34 through a capacitor 36. The wiper arm associated with potentiometer resistor 30 is connected to the ungrounded input terminal of amplifier 34 through a capacitor 37.

Amplifier 34 is connected to a motor 40 to cause operation of the motor upon energization of the amplifier. A mechanical output from motor 40 moves a needle on indicator 41 to indicate the quantity of fuel in the tank. A further mechanical output from motor 40 moves the wiper arm along potentiometer resistor 30 to rebalance the circuit.

Capacitor 36 is so designed in capacitance value and has such a voltage across it as to neutralize the signal from the tank unit 13 when there is no fuel in the tank. The signal from capacitor 37 when the circuit is in balance neutralizes the additional signal from tank unit 13 due to the fuel in the tank. The amplifier and motor combination may be of the type shown in the Upton patent, 2,423,534, assigned to the same assignee as the present invention, while the fuel quantity indicating circuit 20 thus far described is shown in more detail in the Bancroft application 181,747, filed August 28, 1950, also assigned to the same assignee as the present invention.

Tank unit 16 has its signal sent into a fuel quantity indicating circuit 42 while the signal from tank unit 17 is sent into a fuel quantity indicating circuit 43, both of which may be identical in nature to the quantity indicating circuit 20.

Motor 40 has a mechanical connection 44 which moves a wiper arm 45 along a potentiometer resistor 46 in a transducer 47. The potentiometer resistor 46 is connected across the secondary winding 50 of a transformer 51 having a primary winding 52 connected to a source of alternating voltage, not shown. One terminal of potentiometer resistor 46 is connected to a ground terminal 53.

The wiper arm 45 is connected to one terminal of primary winding 54 of a transformer 55 having a secondary winding 56. The other terminal of transformer primary winding 54 is connected to ground terminal 57. The center tap of transformer secondary winding 56 is connected to a ground terminal 60.

Fuel quantity indicating circuit 43 is connected to a transducer 61 while fuel quantity indicating circuit 42 is connected to a transducer 62, each of which is similar to transducer 47. Transducer 61 feeds into a transformer 63 while transducer 62 feeds into a transformer 64 in the same manner that transducer 47 feeds into transformer 55.

Since the center taps of the transformer secondary windings of transformers 55, 63 and 64 are grounded it is obvious that the phase of the voltage taken from the secondary winding of each will depend upon whether or not the voltage picked off is taken from between the upper terminal and the center tap or from between the lower terminal and the center tap. This is done for purposes presently to be described.

An X-moment summing circuit 65 is connected to transformers 55, 63 and 64 as follows: the upper terminal of secondary winding 56 of transformer 55 is connected by conductor 66 and resistor 67 to a common point 70 in the X-moment summing circuit 65. The lower terminal of the secondary winding of transformer 63 is connected by conductor 71 and resistor 72 to the common point 70 and the upper terminal of secondary winding of transformer 64 is connected by conductor 72 and resistor 73 to the common point 70. X-moment summing circuit 65 is set up to be the moment summing circuit for the X axis by making the values of the summing resistors 67, 73 and 72 inversely proportional to the distances $X_1$, $X_2$ and $X_3$ respectively. Since the centers of gravities of tanks 10 and 11 are both on the same side of the Y—Y' axis the voltages relating to the quantities of fuel in these are impressed on the moment summing circuit for the X axis in the same phase, while because the center of gravity of tank 12 is on the other side of the Y—Y' axis the voltage relating to the quantity of fuel in this tank is impressed on the moment summing circuit for the X axis in the opposite phase to the other two voltages.

It is often desirable to consider the moment of the aircraft itself with respect to the desired center of gravity since it would then be possible to schedule the use of the fuel from the various tanks so that the resultant center of gravity of the aircraft and the fuel could be made to agree with the desired center of gravity. For this reason a voltage from a potentiometer resistor 270 is added to the other X-moment summing voltages at point 70 through a conductor 239 and a moment summing resistor 271. Potentiometer resistor 270 is connected across secondary winding 272 of a transformer 273 having a primary winding 274 connected to a source of alternating voltage, not shown. Transformer secondary winding 272 is center-tapped to ground enabling a voltage of either a first or a second phase to be taken from potentiometer resistor 270. The wiper arm associated with potentiometer resistor 270 is connected to a knob 275 for movement of the wiper arm. The knob 275 may be moved manually.

Moment summing circuit 74 for the Y axis is of the same manner of construction as the moment summing circuit for the X axis 65. The signals relating to the quantities of fuel in tanks 10 and 11, which have their centers of gravity on opposite sides of the X—X' axis, are impressed on the Y-moment summing circuit 74 in opposite phase with respect to each other. Because the center of gravity of 12 happens to be on the X—X' axis its Y coordinate is zero and therefore there is no signal impressed on the Y-moment summing circuit 74 relative to the tank 12. A Y-moment contribution for the aircraft is obtained from a potentiometer resistor 276, also connected across transformer secondary winding 272. The voltage output from potentiometer resistor 276 is added to the Y-moment indications of the fuel in the tanks through a conductor 277 and a moment summing resistor 280. The wiper arm associated with potentiometer resistor 276 is connected to a manually operated knob 281 for movement of the wiper arm. As in the case of the X-moment summing circuit 65, the resistors in the Y-moment summing circuit are chosen to have values inversely proportional to the Y displacements of the centers of gravity of the tanks 10 and 11.

The resultant voltage at common point 70 in X-moment summing circuit 65 is impressed on the low-impedance primary winding 75 of a transformer 76 having a secondary winding 77 which has its center tap connected to ground terminal 80. The resultant voltage from the Y-moment summing circuit 74 is impressed on the low-impedance primary winding 81 of a transformer 82 having a secondary winding 83 with a center tap connected to ground terminal 84.

A totalizer circuit 85 totalizes the various fuel quantity signals from the individual tank units. This is done as follows: The upper terminal of transformer secondary winding 56 of transformer 55 is connected by conductors 66 and 86 and resistor 87 to a common point 90; the upper terminal of the secondary winding of transformer 63 is connected by conductors 91 and 92 and resistor 93 to the common point 90; the upper terminal of the secondary winding of transformer 64 is connected by conductors 72 and 94 and resistor 95 to the common point 90. The three resistors 87, 93 and 95 are summing resistors all having the same value. The voltage at common point 90 then is an indication of the total quantity of fuel in all the tanks.

This totalizing voltage is impressed on the input circuit of a scheduling computer 96.

The scheduling computer includes an amplifier 97 with the common point 90 connected to one of the input terminals of the amplifier 97 through a conductor 100 and a resistor 101. The other input terminal of the amplifier 97 is connected to a ground terminal 102. The output terminals of the amplifier 97 are connected in energizing relation to a motor 103 to cause reversible operation of the motor upon energization of the amplifier. The amplifier and motor combination may be of the type shown and described in the Upton Patent 2,423,534. The mechanical output of the motor is connected to a wiper arm 104 associated with a potentiometer resistor 105 having one terminal connected to a ground terminal 106. The potentiometer resistor 105 is connected across a transformer secondary winding 107 of a transformer 110 having a primary winding 111 connected to a source of alternating voltage, not shown. The potentiometer wiper arm 104 is connected through a summing resistor 112 and conductor 113 to the ungrounded input terminal of amplifier 97 for rebalancing purposes. The motor 103 is also mechanically connected to a velocity generator 114 with the electrical output of the velocity generator being connected through a summing resistor 115 to the ungrounded input terminal of amplifier 97 for anti-hunt purposes.

Also included in the scheduling computer 96 is a transformer 116 having a primary winding 117 connected to a source of alternating voltage, not shown, and a secondary winding 120. Three poentiometer resistors 121, 122 and 123 are connected in parallel across transformer secondary winding 120. Motor 103 is mechanically connected to the wiper arms associated with these three potentiometer resistors for movement of the wiper arms with change in total fuel quantity. The potentiometer resistors are characterized in accordance with the amount of fuel it is desired to have in each tank with respect to the total amount of fuel being carried at any instant in order to keep the actual center of gravity point at the desired position or within a practical and safe range of position.

The outputs of the moment-summing circuits and the scheduling computer are impressed on the input circuits of valve control servos 124, 125 and 126, one valve control servo for each tank. These valve control servos control the valves 127, 130 and 131 respectively in the outlet pipes of the individual tanks 10, 11 and 12. Though not shown, each tank 10, 11 and 12 has an outlet pipe with one of the valves 127, 130 and 131 in each pipeline respectively.

The input circuits to the valve control servo 124 are as follows: from the upper terminal of transformer secondary winding 77, in the output circuit of the X-moment summing circuit, through conductor 132 and summing resistor 133 to a common point 134 in the input circuit of the valve control servo 124; from the upper terminal of transformer secondary winding 83 of transformer 82, in the output circuit of the Y-moment summing circuit, through conductor 135 and summing resistor 136 to the common point 134; and from the wiper arm associated with potentiometer resistor 123, in the scheduling computer 96, through conductor 137 and summing resistor 140 to the common point 134. The signal voltage on common point 134 is connected by conductor 141, fixed switching contact 142, movable switching contact 143 and conductor 144 to an input terminal of amplifier 145. The other input terminal of amplifier 145 is connected to ground terminal 146. Amplifier 145 is connected to a motor 147 for reversible operation thereof. The amplifier and motor combination may be of the type found in the above mentioned Upton patent.

Motor 147 is mechanically connected to the wiper arm associated with a potentiometer resistor 150 connected across secondary winding 151 of a transformer 152 having a primary winding 153 connected to a source of alternating voltage, not shown. One terminal of potentiometer resistor 150 is also connected to ground terminal 154. The wiper arm associated with potentiometer resistor 150 is connected through a summing resistor 155 to the ungrounded input terminal of amplifier 145 for rebalancing purposes.

Motor 147 is also mechanically connected to valve 127 which, though not shown, is connected in the output pipe of tank 10.

Movable contact 143 normally makes contact with fixed contact 142 in a normally-closed switching arrangement. The movable contact 143 is operated upon by a relay winding 156 which is energized by a circuit later to be described.

The moment-summing circuits and the wiper arms associated with potentiometer resistors 121 and 122 in scheduling computer 96 are also connected to valve control servos 125 and 126 respectively in a similar manner. The input circuits of the valve control servos 125 and 126 also pass through switching contacts, the movable contacts of which are acted upon by the relay winding 156.

If so desired, the amount by which the actual center of gravity differs from the desired center of gravity may be indicated by center of gravity computers 157 and 160. Center of gravity computer 157 is shown to have an amplifier 161 having a first input signal from X-moment summing circuit 65 through transformer 76, conductors 132 and 162, and summing resistor 163 to an input terminal of the amplifier. The other input terminal of the amplifier is connected to ground terminal 164. Another input signal to the amplifier 161 is from a potentiometer resistor 167 having its wiper arm connected to the ungrounded input terminal of the amplifier through a resistor 171. The terminals of potentiometer resistor 167 are connected across the secondary winding of a transformer 282. The primary winding of transformer 282 is connected into the circuit as follows. One terminal of the transformer primary winding is connected to the wiper arm 104 associated with potentiometer resistor 105 in scheduling computer 96 through conductors 214 and 283. The other terminal of the primary winding of transformer 282 is connected to the wiper arm associated with a potentiometer resistor 284. Potentiometer resistor 284 has one terminal connected to one terminal of transformer secondary winding 272 with the other potentiometer resistor terminal connected to ground terminal 285. The wiper arm associated with potentiometer resistor 284 is manually adjusted by means of a knob 286 in accordance with the weight of the aircraft. Since the voltage output on the wiper arm associated with potentiometer resistor 105 is an indication of the total weight of fuel and the voltage output from the wiper arm associated with the potentiometer resistor 284 is an indication of the weight of the aircraft, it is seen that, because the signals from the two potentiometers are out of phase with each other, the voltage across the primary winding of transformer 282 is an indication of the total weight of the aircraft, including the fuel. The secondary winding of transformer 282 is center tapped to ground terminal 170.

Amplifier 161 is connected in operative relation to a motor 172 for reversible operation thereof. Motor 172 has a mechanical connection to the wiper arm associated with potentiometer resistor 167 to move the wiper arm in such a direction as to neutralize the signal from the X-moment summing circuit 65. Here again, the amplifier and motor combination may be that shown and described in the above mentioned Upton patent. Motor 172 also has a mechanical connection to the pointer of a dial 173 which may be calibrated to show the distance the actual center of gravity is from the Y—Y' axis.

Center of gravity computer 160 is the same in construction and operation as the center of gravity computer 157 and so is shown merely in outline form. The only difference between the two center of gravity computers is that one of the input signals to center of gravity computer 160 is from the Y-moment summing circuit 74 rather than from the X-moment summing circuit 65. The other input signal for the Y-center of gravity computer 160 is taken from across the secondary winding of transformer 282. As a result, the output indication of center of gravity computer 160 is an indication of the distance the actual center of gravity is from the X—X' axis.

If desired, a fuel quantity indicator 174 may also be added. The fuel quantity indicator comprises an amplifier 175 having an input terminal to which the common point 90 from the totalizing circuit 85 is connected by conductor 176, fixed contact 177, movable contact 180, conductor 181 and resistor 179 to one of the input terminals of amplifier 175. The other input terminal of amplifier 175 is connected to ground terminal 182. The amplifier 175 is connected in operative relation to motor 183 for reversible operation thereof. A mechanical output connection from motor 183 is connected to the wiper arm associated with a potentiometer resistor 184 having one resistor terminal connected to ground terminal 185. The potentiometer resistor 184 is connected across the secondary winding 186 of a transformer 187 having a primary winding 190 connected to a source of power, not shown. The wiper arm associated with potentiometer resistor 184 is connected through a summing resistor 191 to the ungrounded input terminal of amplifier 175 for rebalancing purposes. The amplifier and motor combination may be the same as that shown in the Upton patent, above mentioned.

The motor 183 is also connected through a mechanical connection to a pointer on an indicator dial 192 to indicate quantity of fuel. When connected in the above described manner the indicator 192 indicates the total quantity of fuel in all the tanks. It is possible, however, for the fuel quantity indicator 174 to alternatively indicate the quantity of fuel in each of the individual tanks. This is done as follows: conductor 86, from transformer 55 in the circuit from tank unit 13, may be connected through a conductor 195 to a fixed contact 196. Conductor 92, which is connected in circuit with tank unit 17, may be connected through a conductor 197 to a fixed contact 200 while conductor 94, which is in circuit with tank unit 16, may be connected through conductor 193 to a fixed contact 194. Fixed contacts 194, 196 and 200 may make contact with conductor 181 by moving movable contact 180 to make connection with a chosen one of the fixed contacts. When movable contact 180 makes connection with fixed contact 194 indicator dial 192 will give an indication of the amount of fuel in tank 11 while if the movable contact makes connection with fixed contact 196 the indicator dial 192 will give an indication of quantity of fuel in tank 10. Also, if movable contact 180 makes connection with fixed contact 200 the indicator dial 192 will give an indication of quantity of fuel in tank 12. It is thus seen that by merely moving the movable contact 180 to any one of the fixed contacts it is possible to register the quantity of fuel in any one of the individual tanks or to register the total quantity of fuel found in all the tanks.

If one of the tanks should become empty the circuit, as it has been described above, would tend to close off the valves in the output pipes from the other tanks in order to keep the actual center of gravity in close conformity with the desired center of gravity. This would result in all the fuel lines being cut off and would stop the flow of fuel to the engines, with corresponding disastrous results. Consequently, an override control 201 has been placed in the circuit. This override control includes a relay connected in circuit with each of the tank units and a further relay connected in circuit with potentiometers, the outputs of which is an indication of the total quantity of fuel. Relay winding 202 is connected to the upper terminal of transformer secondary winding 56, in circuit with tank unit 13, by conductor 203. The other terminal of relay winding 202 is connected to ground terminal 204. Relay winding 205 is connected to the upper terminal of the secondary winding of transformer 64, which is in circuit with tank unit 16, by conductor 206. The other terminal of relay winding 205 is connected to ground terminal 207. Relay winding 210 is connected to the upper terminal of the secondary winding of transformer 63, which is in circuit with tank unit 17, by conductor 211. The other terminal of relay winding 210 is connected to ground terminal 212. Relay winding 213 is connected to the wiper arm 104 associated with potentiometer resistor 105 by conductor 214. The other terminal of relay winding 213 is connected to ground terminal 215.

Relay winding 202 operates a movable contact 216 which makes connection to fixed contact 217. Relay winding 205 operates a movable contact 220 to make connection to fixed contact 221. Relay winding 210 has a movable contact 222 which makes connection to a fixed contact 223. Relay winding 213 has a movable contact 224 which makes connection to a fixed contact 225. Normally the relay windings 202, 205, 210 and 213 are energized by the voltages from transformers 51, 55 and 63 to hold the contacts open. Movable contacts 216, 220, 222 and 224 are connected together to one terminal of a transformer secondary winding 226 of a transformer 227 having a primary winding 230 connected to a source of alternating voltage, not shown. The other terminal of transformer secondary winding 226 is connected to ground terminal 231. The fixed contacts 217, 221, 223 and 225 are all connected together to one terminal of relay winding 156. The other terminal of relay winding 156 is connected to a ground terminal 232. When the energization of any one of the relay windings 202, 205, 210 or 213 becomes small enough so that the relay winding is no longer able to hold its associated contacts open, a circuit is closed from the ungrounded terminal of transformer secondary winding 226 through the then closed contacts, through relay winding 156 and ground terminals 232 and 231 back to transformer secondary winding 226. This energizes relay winding 156 to raise the movable contact 143 away from fixed contact 142, as well as moving the movable contacts in the circuits of valve control servos 125 and 126 away from their fixed contacts to open the circuits from the various moment summing circuits and scheduling computer to the valve control servos and cut off the signals to the valve control servos. As a result, there is no further energization of the amplifiers in the various valve control servos nor operation of the motors and the valves 127, 130 and 131 remain fixed in the open positions to which they had been driven by the motors in the valve control servos. The tanks which still have fuel in them will then continue to drain the fuel at the same speed at which the fuel had been draining. If desired, it is, of course, understood that upon the signals to the valve control servos being cut off the valves 127, 130 and 131 could be driven to their wide open position. This could be done by spring loading the valves or in any other convenient manner.

In the modification of Figure 2, two racks of small bombs 240 and 241 and two large bombs 242 and 243 are considered along with the weights of fuel in the tanks 10, 11 and 12 and the weight of the aircraft in computing the combined center of gravity. The circuit of Figure 2 is similar to that of Figure 1, the only differences being in adding in the indications due to the various bombs.

The signal due to the string of bombs 240 is impressed into the circuit as follows. When the string of bombs 240 is loaded into the racks a movable contact 244 of a switch makes contact with a fixed contact 245 to complete a circuit from a source of alternating voltage, not shown, connected to the terminal 246 and a ground terminal 247. This closing of switch contacts 244 and 245 connects the source of alternating voltage across a transformer primary winding 250 of a transformer 251 having a center-tapped secondary winding 252. The center tap of transformer secondary winding 252 is connected to ground terminal 253. It can be seen that the transformer 251 is similar to the transformer 55. Since the weight of the string of bombs is fixed and is known it is not necessary to place a potentiometer into the circuit in order to vary the voltage across transformer primary winding 250. If the weight of the string of bombs should vary from trip to trip it would be desirable, of course, to include a potentiometer in the circuit with the weight of the bombs determining the amount of voltage to be picked off the potentiometer. A spring 254 attached to movable contact 244 of the switch breaks the connection between the contacts 244 and 245 when the string of bombs is dropped, thus opening the energizing circuit to transformer primary winding 250.

Because the string of bombs 240 is to the right, or aft, of the Y axis the lower terminal of transformer secondary winding 252 is connected to the X-axis summing circuit 65 by conductor 255. This is so the polarity of the X-axis direction voltage signal will have a proper polarity with respect to the direction indications of the fuel in the three tanks 10, 11 and 12. Because the string of bombs 240 is above the X axis, or on the right side of the craft, transformer secondary winding 252 is connected to the Y-axis summing circuit 74 by conductor 256 connected to its upper terminal. In addition, the upper terminal of transformer secondary winding 252 is also connected to the weight totalizing circuit 257.

It should be noted that the upper terminals of the transformer secondary windings of transformers 55, 63 and 64 are connected to the totalizing circuit 257 as well as to the fuel weight totalizing circuit 85. The construction of the totalizing circuit 257 is similar to that of the totalizing circuit 85, the only difference being that there are more inputs in the totalizing circuit 257 for the reason that the weights of the bombs are included with the weights of the fuel in the totalizing circuit 257. The rack of bombs 241 operates upon a switch 260 for energization of transformer 261. The transformer 261 is similar to transformer 251 with the upper terminal of the secondary winding being connected to the totalizing circuit 257 and the lower terminal being connected to both X-axis moment summing circuit and Y-axis moment summing circuit 65 and 74 respectively.

Bomb 242 operates on a switch 262 to control the energization of transformer 263, which also is similar to transformer 251. Here again, the upper terminal of the secondary winding of transformer 263 is connected to totalizing circuit 257 and the Y-axis moment summing circuit 74 while the lower terminal of the secondary winding of transformer 63 is connected to the X-axis moment summing circuit 65.

Bomb 243 operates upon a switch 264 to control the energization of transformer 265, which also is similar to transformer 251. Here again, the upper terminal of the secondary winding of transformer 265 is connected to the totalizing circuit 257 while the lower terminal of the secondary winding is connected to the X-axis moment summing circuit 65 and the Y-axis moment summing circuit 74.

It is thus seen that the X-axis moment summing circuit includes the moments of each of the bombs as well as of the fuel in the various tanks by taking into account the weights of the various objects as well as their distances and directions from the Y—Y' axis. Y-axis moment summing circuit 74 produces a signal indicative of the resultant moment of the various objects from the X—X' axis. The moment summing circuits 65 and 74 of Figure 2 are the same as the moment summing circuits 65 and 74 of Figure 1, the only difference being that additional inputs are placed into both of the moment summing circuits in Figure 2.

The totalizing circuit 85 of Figure 2 still obtains a voltage signal indicative of the total weight of fuel in the various tanks, which signal is impressed on the indicator circuit 174 to indicate the total amount of fuel in the craft.

Totalizing circuit 257, on the other hand, obtains a voltage signal indicative of the total amount of weight of all the masses of weights for use in the scheduling computer 96 and also provides signal inputs for the ΔX and ΔY indicators 157 and 160 and the override control 201. Since the weights and distances of the bombs from the desired center of gravity is important in determining the resultant moments of the masses of weights from the desired center of gravity they are put into the X-axis and the Y-axis moment summing circuits to provide a signal to the servo controls 124, 125, and 126. For this reason they are also used in computing the distance of the actual center of gravity from the desired center of gravity in both the X axis and Y axis.

Since the total weight of all the masses of weights is going to have an effect upon the amount of fuel to be drained from each tank the totalizing voltage signal is made indicative of the weights of the various bombs when they are in the plane as well as the weight of the fuel in the tanks. When any of the strings of bombs or individual bombs are dropped the voltage signals relating to that particular bomb or bombs will be removed from the circuit by the deenergization of the transformer corresponding to that bomb or those bombs.

It is thus seen that there has been shown and described a circuit which will compute the actual center of gravity of any number of objects, the weights of which are known or are calculable and the distances from the desired center of gravity of which are known. A means of controlling the actual center of gravity by automatic adjustment of rates of drainage of fuel from fuel tanks, so that it conforms with the desired center of gravity, has also been achieved. An indication of the distance by which the actual center of gravity differs from the desired center of gravity as well as an indication of the total quantity of fuel and the quantities of fuel in each of the individual tanks has also been attained.

While preferred modifications have been shown and described it is realized that changes may be made by those skilled in the art and it is therefore intended that the scope of the invention be limited only to the extent of the appended claims.

We claim:

1. Apparatus for controlling the center of gravity of a plurality of fuel tanks each having an outlet valve in a craft comprising, in combination: separate quantity indicating means associated with each tank, each means deriving a signal voltage indicative of the quantity of fuel in that tank with which it is associated; moment summing means for a first axis; means connecting said quantity indicating means to said moment summing means and algebraically adding the fuel quantity signals through moment resistors, the magnitudes of the resistors being of predetermined values with respect to each other depending upon the perpendicular distance of the center of gravity of each tank to the first axis, each quantity indicating means signal being added having a relative polarity with respect to the polarity of the other quantity indicating means signals being added dependent upon the direction of the tank from the axis with respect to the direction of the other tanks from the axis; moment summing means for a second axis; means connecting said quantity indicating means to said moment summing means for the second axis and algebraically adding the fuel quantity signals through moment resistors, the magnitudes of the resistors being of predetermined values with respect to each other depending upon the perpendicular distance of the center of gravity of each tank to the second axis, each quantity indicating means signal being added having a relative polarity with respect to the polarity of the other quantity indicating means signals being added dependent upon the direction of the tank from the second axis with respect to the direction of the other tanks from the second axis; totalizing means; means connecting all of said quantity indicating means to said totalizing means and adding the fuel quantity signals and obtaining a signal voltage indicative of the total quantity of fuel; scheduling means; means connecting said totalizing means to said scheduling means and deriving a signal voltage for each tank depending upon the total quantity of fuel in all the tanks and the quantity of fuel each tank should have with respect to the quantity of fuel the other tanks should have at that particular total quantity of fuel in order that the center of gravity of the plurality of tanks be the desired center of gravity; separate control servo means connected to the outlet valve of each tank; means connecting said first and said second moment summing means and said scheduling means to each of said control servo means to control said servo means such that the flow of fuel from each tank with respect to the total flow of fuel from all the tanks is such as to maintain the center of gravity of the plurality of tanks within predetermined limits; first indicator means; means connecting said first moment summing means and said totalizing means to said first indicator means and providing an indication of the perpendicular distance of the center of gravity of the tanks from the first axis; second indicator means; means connecting said second moment summing means and said totalizing means to said second indicator means and providing an indication of the perpendicular distance of the center of gravity of the tanks from the second axis; override control means; means connecting said quantity indicating means to said override control means and energizing said override control means upon one of the tanks being empty; and means connecting said override control means to said control servo means and controlling the operation of said control servo means upon said override control being energized.

2. Apparatus for controlling the center of gravity of a plurality of fuel tanks each having an outlet valve in a craft comprising, in combination: separate quantity indicating means associated with each tank, each means deriving a signal voltage indicative of the quantity of fuel in that tank with which it is associated; moment summing means for a first axis; means connecting said quantity indicating means to said moment summing means and algebraically adding the fuel quantity signals through moment resistors, the magnitudes of the resistors being of predetermined values with respect to each other depending upon the perpendicular distance of the center of gravity of each tank to the first axis, each quantity indicating means signal being added having a relative polarity with respect to the polarity of the other quantity indicating means signals being added dependent upon the direction of the tank from the axis with respect to the direction of the other tanks from the axis; moment summing means for a second axis; means connecting said quantity indicating means to said moment summing means for the second axis and algebraically adding the fuel quantity signals through moment resistors, the magnitudes of the resistors being of predetermined values with respect to each other depending upon the perpendicular distance of the center of gravity of each tank to the second axis, each quantity indicating means signal being added having a relative polarity with respect to the polarity of the other quantity indicating means signals being added dependent upon the direction of the tank from the second axis with respect to the direction of the other tanks from the second axis; totalizing means; means connecting all of said quantity indicating means to said totalizing means and adding the fuel quantity signals and obtaining a signal voltage indicative of the total quantity of fuel; scheduling means; means connecting said totalizing means to said scheduling means and deriving a signal voltage for each tank depending upon the total quantity of fuel in all the tanks and the quantity of fuel each tank should have with respect to the quantity of fuel the other tanks should have at that particular total quantity of fuel in order that the center of gravity of the plurality of tanks be the desired center of gravity; separate control servo means connected to the outlet valve of each tank; means connecting said first and said second moment summing means and said scheduling means to each of said control servo means to control said servo means such that the flow of fuel from each tank with respect to the total flow of fuel from all the tanks is such as to maintain the center of gravity of the plurality of tanks within predetermined limits; first indicator means; means connecting said first moment summing means and said totalizing means to said first indicator means and providing an indication of the perpendicular distance of the center of gravity of the tanks from the first axis; second indicator means; and means connecting said second moment summing means and said totalizing means to said second indicator means and providing an indication of the perpendicular distance of the center of gravity of the tanks from the second axis.

3. Apparatus for controlling the center of gravity of a plurality of fuel tanks each having an outlet valve in a craft comprising, in combination: separate quantity indicating means associated with each tank, each means deriving a signal voltage indicative of the quantity of fuel in that tank with which it is associated; moment summing means for a first axis; means connecting said quantity indicating means to said moment summing means and algebraically adding the fuel quantity signals through moment resistors, the magnitudes of the resistors being of predetermined values with respect to each other depending upon the perpendicular distance of the center of gravity of each tank to the first axis, each quantity indicating means signal being added having a relative polarity with respect to the polarity of the other quantity indicating means signals being added dependent upon the direction of the tank from the axis with respect to the direction of the other tanks from the axis; moment summing means for a second axis; means connecting said quantity indicating means to said moment summing means for the second axis and algebraically adding the fuel quantity signals through moment resistors, the magnitudes of the resistors being of predetermined values with respect to each other depending upon the perpendicular distance of the center of gravity of each tank to the second axis, each quantity indicating means signal being added having a relative polarity with respect to the polarity of the other quantity indicating means signals being added dependent upon the direction of the tank from the second axis with respect to the direction of the other tanks from the second axis; totalizing means; means connecting all of said quantity indicating means to said totalizing means and adding the fuel quantity signals and obtaining a signal voltage indicative of the total quantity of fuel; scheduling means; means connecting said totalizing means to said scheduling means and deriving a signal voltage for each tank depending upon the total quantity of fuel in all the tanks and the quantity of fuel each tank should have with respect to the quantity of fuel the other tanks should have at that particular total quantity of fuel in order that the center of gravity of the plurality of tanks be the desired center of gravity; separate control servo means connected to the outlet valve of each tank; and means connecting said first and said second moment summing means and said scheduling means to each of said control servo means to control said servo means such that the flow of fuel from each tank with respect to the total flow of fuel from all the tanks is such as to maintain the center of gravity of the plurality of tanks within predetermined limits.

4. Apparatus for controlling the center of gravity of a plurality of fuel tanks each having an outlet valve in a craft comprising, in combination: separate quantity indicating means associated with each tank, each means deriving a signal voltage indicative of the quantity of fuel in that tank with which it is associated; moment summing means for a first axis; means connecting said quantity indicating means to said moment summing means and algebraically adding the fuel quantity signals; moment summing means for a second axis; means connecting said quantity indicating means to said moment summing means for the second axis and algebraically adding the fuel quantity signals; totalizing means; means connecting all of said quantity indicating means to said totalizing means and adding the fuel quantity signals and obtaining a signal voltage indicative of the total quantity of fuel; scheduling means; means connecting said totalizing means to said scheduling means and deriving a signal voltage for each tank depending upon the total quantity of fuel in all the tanks and the quantity of fuel each tank should have with respect to the quantity of fuel the other tanks should have at that particular total quantity of fuel in order that the center of gravity of the plurality of tanks be the desired center of gravity; separate control servo means connected to the outlet valve of each tank; means connecting said first and said second moment summing means and said scheduling means to each of said control servo means to control said servo means such that the flow of fuel from each tank with respect to the total flow of fuel from all the tanks is such as to maintain the center of gravity of the plurality of tanks within predetermined limits; first indicator means; means connecting said first moment summing means and said totalizing means to said first indicator means and providing an indication of the perpendicular distance of the center of gravity of the tanks from the first axis; second indicator means; means connecting said second moment summing means and said totalizing means to said second indicator means and providing an indication of the perpendicular distance of the center of gravity of the tanks from the second axis; override control means; means connecting said quantity indicating means to said override control means and energizing said override control means upon one of the tanks being empty; and means connecting said override control means to said control servo means and controlling the operation of said control servo means upon said override control being energized.

5. Apparatus for controlling the center of gravity of a plurality of fuel tanks each having an outlet valve in a craft comprising, in combination: separate quantity indicating means associated with each tank, each means deriving a signal voltage indicative of the quantity of fuel in that tank with which it is associated; moment summing means for a first axis; means connecting said quantity indicating means to said moment summing means and algebraically adding the fuel quantity signals through moment resistors, the magnitudes of the resistors being of predetermined values with respect to each other depending upon the perpendicular distance of the center of gravity of each tank to the first axis; moment summing means for a second axis; means connecting said quantity indicating means to said moment summing means for the second axis and algebraically adding the fuel quantity signals through moment resistors, the magnitudes of the resistors being of predetermined values with respect to each other depending upon the perpendicular distance of the center of gravity of each tank to the second axis; totalizing means; means connecting all of said quantity indicating means to said totalizing means and adding the fuel quantity signals and obtaining a signal voltage indicative of the total quantity of fuel; scheduling means; means connecting said totalizing means to said scheduling means and deriving a signal voltage for each tank depending upon the total quantity of fuel in all the tanks and the quantity of fuel each tank should have with respect to the quantity of fuel the other tanks should have at that particular total quantity of fuel in order that the center of gravity of the plurality of tanks be the desired center of gravity; separate control servo means connected to the outlet valve of each tank; and means connecting said first and said second moment summing means and said scheduling means to each of said control servo means to control said servo means such that the flow of fuel from each tank with respect to the total flow of fuel from all the tanks is such as to maintain the center of gravity of the plurality of tanks within predetermined limits.

6. Apparatus for controlling the center of gravity of a plurality of fuel tanks each having an outlet valve in a craft comprising, in combination: separate quantity indicating means associated with each tank, each means deriving a signal voltage indicative of the quantity of fuel in that tank with which it is associated; moment summing means for a first axis; means connecting said quantity indicating means to said moment summing means and algebraically adding the fuel quantity signals; moment summing means for a second axis; means connecting said quantity indicating means to said moment summing means for the second axis and algebraically adding the fuel quantity signals; totalizing means; means connecting all of said quantity indicating means to said totalizing means and adding the fuel quantity signals and obtaining a signal voltage indicative of the total quantity of fuel; scheduling means; means connecting said totalizing means to said scheduling means and deriving a signal voltage for each tank depending upon the total quantity of fuel in all the tanks and the quantity of fuel each tank should have with respect to the quantity of fuel the other tanks should have at that particular total quantity of fuel in order that the center of gravity of the plurality of tanks be the desired center of gravity; separate control servo means connected to the outlet valve of each tank; means connecting said first and said second moment summing means and said scheduling means to each of said control servo means to control said servo means such that the flow of fuel from each tank with respect to the total flow of fuel from all the tanks is such as to maintain the center of gravity of the plurality of tanks within predetermined limits; first indicator means; means connecting said first moment summing means and said totalizing means to said first indicator means and providing an indication of the perpendicular distance of the center of gravity of the tanks from the first axis; second indicator means and means connecting said second moment summing means and said totalizing means to said second indicator means and providing an indication of the perpendicular distance of the center of gravity of the tanks from the second axis.

7. Apparatus for controlling the center of gravity of a plurality of fuel tanks each having an outlet valve in a craft comprising, in combination: separate quantity indicating means associated with each tank, each means deriving a signal voltage indicative of the quantity of fuel in that tank with which it is associated; moment summing means for a first axis; means connecting said quantity indicating means to said moment summing means and algebraically adding the fuel quantity moment signals; moment summing means for a second axis; means connecting said quantity indicating means to said moment summing means for the second axis and algebraically adding the fuel quantity moment signals; totalizing means; means connecting all of said quantity indicating means to said totalizing means and adding the fuel quantity signals and obtaining a signal voltage indicative of the total quantity of fuel; scheduling means; means connecting said totalizing means to said scheduling means and deriving a signal voltage for each tank depending upon the total quantity of fuel in all the tanks and the quantity of fuel each tank should have with respect to the quantity of fuel the other tanks should have at that particular total quantity of fuel in order that the center of gravity of the plurality of tanks be the desired center of gravity; separate control servo means connected to the outlet valve of each tank; and means connecting said first and said second moment summing means and said scheduling means to each of said control servo means to control said servo means such that the flow of fuel from each tank with respect to the total flow of fuel from all the tanks is such as to maintain the center of gravity of the plurality of tanks within predetermined limits.

8. Apparatus for controlling the center of gravity of a plurality of fuel tanks each having an outlet valve in a craft comprising, in combination: separate quantity indicating means associated with each tank, each means deriving a signal voltage indicative of the quantity of fuel in that tank with which it is associated; moment summing means for a first axis; means connecting said quantity indicating means to said moment summing means and algebraically adding the fuel quantity moment signals; moment summing means for a second axis; means connecting said quantity indicating means to said moment summing means for the second axis and algebraically adding the fuel quantity moment signals; scheduling means; means connecting said quantity indicating means to said scheduling means and deriving a signal voltage for each tank depending upon the total quantity of fuel in all the tanks and the quantity of fuel each tank should have with respect to the quantity of fuel the other tanks should have at that particular total quantity of fuel in order that the center of gravity of the plurality of tanks be the desired center of gravity; separate control servo means connected to the outlet valve of each tank; and means connecting said first and said second moment summing means and said scheduling means to each of said control servo means to control said servo means such that the flow of fuel from each tank with respect to the total flow of fuel from all the tanks is such as to maintain the center of gravity of the plurality of tanks within predetermined limits.

9. Apparatus for controlling the center of gravity of a plurality of fuel tanks each having an output means in a craft comprising, in combination: separate quantity indicating means associated with each tank, each means deriving a signal voltage indicative of the quantity of fuel in that tank with which it is associated; moment summing means for a first axis; means connecting said quantity indicating means to said moment summing means and algebraically adding the fuel quantity moment signals; moment summing means for a second axis; means connecting said quantity indicating means to said moment summing means for the second axis and algebraically adding the fuel quantity moment signals; totalizing means; means connecting all of said quantity indicating means to said totalizing means and adding the fuel quantity signals and obtaining a signal voltage indicative of the total quantity of fuel; control servo means associated with each tank output for controlling the flow of fuel from that tank; and means connecting said first and said second moment summing means to each of said control servo means to control said servo means such that the flow of fuel from each tank with respect to the total flow of fuel from all the tanks is such as to maintain the center of gravity of the plurality of tanks within predetermined limits.

10. Apparatus for controlling the center of gravity of a plurality of fuel tanks each having an outlet valve in a craft comprising, in combination: separate quantity indicating means associated with each tank, each means deriving a signal indicative of the quantity of fuel in that tank with which it is associated; scheduling means; means connecting said quantity indicating means to said scheduling means and deriving a signal for each tank depending upon the total quantity of fuel in all the tanks and the quantity of fuel each tank should have with respect to the quantity of fuel the other tanks should have at that particular total quantity of fuel in order that the center of gravity of the plurality of tanks be the desired center of gravity; separate control servo means connected to the outlet valve of each tank; and means connecting said scheduling means to each of said control servo means to control said servo means such that the flow of fuel from each tank with respect to the total flow of fuel from all the tanks is such as to maintain the center of gravity of the plurality of tanks within predetermined limits.

11. Apparatus for controlling the center of gravity of a plurality of fuel tanks each having an output means in a craft comprising, in combination: separate quantity indicating means associated with each tank, each means deriving a signal voltage indicative of the quantity of fuel in that tank with which it is associated; moment summing means for a first axis; means connecting said quantity indicating means to said moment summing means and algebraically adding the fuel quantity moment signals; moment summing means for a second axis; means connecting said quantity indicating means to said moment summing means for the second axis and algebraically adding the fuel quantity moment signals; control servo means associated with each tank output for controlling the flow of fuel from that tank; and means connecting said first and said second moment summing means to each of said control servo means to control said servo means such that the flow of fuel from each tank with respect to the total flow of fuel from all the tanks is such as to maintain the center of gravity of the plurality of tanks within predetermined limits.

12. Apparatus for controlling the center of gravity of a plurality of fuel tanks each having an output means in a craft comprising, in combination: separate quantity indicating means associated with each tank, each means deriving a signal indicative of the quantity of fuel in that tank with which it is associated; moment summing means for an axis; means connecting said quantity indicating means to said moment summing means and algebraically adding the fuel quantity moment signals; control servo means associated with each tank output for controlling the flow of fuel from that tank; and means connecting said moment summing means to each of said control servo means to control said servo means such that the flow of fuel from each tank with respect to the total flow of fuel from all the tanks is such as to maintain the center of gravity of the plurality of tanks within predetermined limits.

13. Apparatus for controlling the center of gravity of a plurality of masses of weights including fuel tanks each having an outlet valve in a craft comprising, in combination: separate weight indicating means associated with each mass, each means deriving a signal voltage indicative of the weight of the mass with which it is associated; moment summing means for a first axis; means connecting said weight indicating means to said moment summing means and algebraically adding the weight signals through moment resistors, the magnitudes of the resistors being of predetermined values with respect to each other depending upon the perpendicular distance of the center of gravity of each mass to the first axis, each weight indicating means signal being added having a relative polarity with respect to the polarity of the other weight indicating means signals being added dependent upon the direction of the mass from the axis with respect to the direction of the other masses from the axis; moment summing means for a second axis; means connecting said weight indicating means to said moment summing means for the second axis and algebraically adding the weight signals through moment resistors, the magnitudes of the resistors being of predetermined values with respect to each other depending upon the perpendicular distance of the center of gravity of each mass to the second axis, each weight indicating means signal being added having a relative polarity with respect to the polarity of the other weight indicating means signals being added dependent upon the direction of the mass from the second axis with respect to the direction of the other masses from the second axis; totalizing means; means connecting all of said weight indicating means to said totalizing means and adding the weight signals and obtaining a signal voltage indicative of the total weight of the masses; scheduling means; means connecting said totalizing means to said scheduling means and deriving a signal voltage for each tank depending upon the total weight of all the masses and the quantity of fuel each tank should have with respect to the quantity of fuel the other tanks should have at that particular total weight of all the masses in order that the center of gravity of the plurality of masses be the desired center of gravity; separate control servo means connected to the outlet valve of each tank; means connecting said first and said second moment summing means and said scheduling means to each of said control servo means to control said servo means such that the flow of fuel from each tank with respect to the total flow of fuel from all the tanks is such as to maintain the center of gravity of the plurality of masses within predetermined limits; first indicator means; means connecting said first moment summing means and said totalizing means to said first indicator means and providing an indication of the perpendicular distance of the center of gravity of the masses from the first axis; second indicator means; means connecting said second moment summing means and said totalizing means to said second indicator means and providing an indication of the perpendicular distance of the center of gravity of the masses from the second axis; override control means; means connecting said weight indicating means to said override control means and energizing said override control means upon one of the tanks being empty; and means connecting said override control means to said control servo means and controlling the operation of said control servo means upon said override control being energized.

14. Apparatus for controlling the center of gravity of a plurality of masses of weights including fuel tanks each having an outlet valve in a craft comprising, in combination: separate weight indicating means associated with each mass, each means deriving a signal voltage indicative of the weight of the mass with which it is associated; moment summing means for a first axis; means connecting said weight indicating means to said moment summing means and algebraically adding the weight signals through moment resistors, the magnitudes of the resistors being of predetermined values with respect to each other depending upon the perpendicular distance of the center of gravity of each mass to the first axis, each weight indicating means signal being added having a relative polarity with respect to the polarity of the other weight indicating means signals being added dependent upon the direction of the mass from the axis with respect to the direction of the other masses from the axis; moment summing means for a second axis; means connecting said weight indicating means to said moment summing means for the second axis and algebraically adding the weight signals through moment resistors, the magnitudes of the resistors being of predetermined values with respect to each other depending upon the perpendicular distance of the center of gravity of each mass to the second axis, each weight indicating means signal being added having a relative polarity with respect to the polarity of the other weight indicating means signals being added dependent upon the direction of the mass from the second axis with respect to the direction of the other masses from the second axis; totalizing means; means connecting all of said weight indicating means to said totalizing means and adding the weight signals and obtaining a signal voltage indicative of the total weight of the masses; scheduling means; means connecting said totalizing means to said scheduling means and deriving a signal voltage for each tank depending upon the total weight of all the masses and the quantity of fuel each tank should have with respect to the quantity of fuel the other tanks should have at that particular total weight of all the masses in order that the center of gravity of the plurality of masses be the desired center of gravity; separate control servo means connected to the outlet valve of each tank; means connecting said first and said second moment summing means and said scheduling means to each of said control servo means to control said servo means such that the flow of fuel from each tank with respect to the total flow of fuel from all the tanks is such as to maintain the center of gravity of the plurality of masses within predetermined limits; first indicator means; means connecting said first moment summing means and said totalizing means to said first indicator means and providing an indication of the perpendicular distance of the center of gravity of the masses from the first axis; second indicator means; and means connecting said second moment summing means and said totalizing means to said second indicator means and providing an indication of the perpendicular distance of the center of gravity of the masses from the second axis.

15. Apparatus for controlling the center of gravity of a plurality of masses of weights including fuel tanks each having an outlet valve in a craft comprising, in combination: separate weight indicating means associated with each mass, each means deriving a signal voltage indicative of the weight of the mass with which it is associated; moment summing means for a first axis; means connecting said weight indicating means to said moment summing means and algebraically adding the weight signals through moment resistors, the magnitudes of the resistors being of predetermined values with respect to each other depending upon the perpendicular distance of the center of gravity of each mass to the first axis, each weight indicating means signal being added having a relative polarity with respect to the polarity of the other weight indicating means signals being added dependent upon the direction of the mass from the axis with respect to the direction of the other masses from the axis; moment summing means for a second axis; means connecting said weight indicating means to said moment summing means for the second axis and algebraically adding the weight signals through moment resistors, the magnitudes of the resistors being of predetermined values with respect to each other depending upon the perpendicular distance of the center of gravity of each mass to the second axis, each weight indicating means signal being added having a relative polarity with respect to the polarity of the other weight indicating means signals being added dependent upon the direction of the mass from the second axis with respect to the direction of the other masses from the second axis; totalizing means; means connecting all of said weight indicating means to said totalizing means and adding the weight signals and obtaining a signal voltage indicative of the total weight of the masses; scheduling means; means connecting said totalizing means to said scheduling means and deriving a signal voltage for each tank depending upon the total weight of all the masses and the quantity of fuel each tank should have with respect to the quantity of fuel the other tanks should have at that particular total weight of all the masses in order that the center of gravity of the plurality of masses be the desired center of gravity; separate control servo means connected to the outlet valve of each tank; and means connecting said first and said second moment summing means and said scheduling means to each of said control servo means to control said servo means such that the flow of fuel from each tank with respect to the total flow of fuel from all the tanks is such as to maintain the center of gravity of the plurality of masses within predetermined limits.

16. Apparatus for controlling the center of gravity of a plurality of masses of weights including fuel tanks each having an outlet valve in a craft comprising, in combination: separate weight indicating means associated with each mass, each means deriving a signal voltage indicative of the weight of the mass with which it is associated; moment summing means for a first axis; means connecting said weight indicating means to said moment summing means and algebraically adding the weight moment signals; moment summing means for a second axis; means connecting said weight indicating means to said moment summing means for the second axis and algebraically adding the weight moment signals; totalizing means; means connecting all of said weight indicating means to said totalizing means and adding the weight signals and obtaining a signal voltage indicative of the total weight of the masses; scheduling means; means connecting said totalizing means to said scheduling means and deriving a signal voltage for each tank depending upon the total weight of all the masses and the quantity of fuel each tank should have with respect to the quantity of fuel the other tanks should have at that particular total weight of all the masses in order that the center of gravity of the plurality of masses be the desired center of gravity; separate control servo means connected to the outlet valve of each tank; and means connecting said first and said second moment summing means and said scheduling means to each of said control servo means to control said servo means such that the flow of fuel from each tank with respect to the total flow of fuel from all the tanks is such as to maintain the center of gravity of the plurality of masses within predetermined limits.

17. Apparatus for controlling the center of gravity of a plurality of masses of weights including fuel tanks each having an outlet valve in a craft comprising, in combination: separate weight indicating means associated with each mass, each means deriving a signal voltage indicative of the weight of the mass with which it is associated; moment summing means for a first axis; means connecting said weight indicating means to said moment summing means and algebraically adding the weight moment signals; moment summing means for a second axis; means connecting said weight indicating means to said moment summing means for the second axis and algebraically adding the weight moment signals; separate control servo means connected to the outlet valve of each tank; and means connecting said first and said second moment summing means to each of said control servo means to control said servo means such that the flow of fuel from each tank with respect to the total flow of fuel from all the tanks is such as to maintain the center of gravity of the plurality of masses within predetermined limits.

18. Apparatus for measuring the difference between the actual center of gravity of a plurality of masses of weights and the desired center of gravity of a craft comprising, in combination: separate weight indicating means associated with each mass, each means deriving a signal indicative of the weight of the mass with which it is associated; moment summing means for a first axis; means connecting said weight indicating means to said moment summing means and algebraically adding the weight signals and obtaining a signal indicative of the total moment of the masses about the first axis; moment summing means for a second axis; means connecting said weight indicating means to said moment summing means for the second axis and algebraically adding the weight signals and obtaining a signal indicative of the total moment of the masses about the second axis; totalizing means; means connecting said weight indicating means to said totalizing means and adding the weight signals and obtaining a signal indicative of the total weight of the masses; first indicator means; means connecting said first moment summing means and said totalizing means to said first indicator means and providing an indication of the distance of the center of gravity of the masses from the first axis; second indicator means; and means connecting said second moment summing means and said totalizing means to said second indicator means and providing an indication of the distance of the center of gravity of the masses from the second axis.

19. Apparatus for measuring the difference between the actual center of gravity of a plurality of masses of weights and the desired center of gravity of a craft comprising, in combination: separate weight indicating means associated with each mass, each means deriving a signal indicative of the weight of the mass with which it is associated; moment summing means for an axis; means connecting said weight indicating means to said moment summing means and algebraically adding the weight signals through moment resistors and obtaining a signal indicative of the total moment of the masses, the magnitudes of the resistors being of predetermined values with respect to each other depending upon the distance of the center of gravity of each mass to the axis, each weight indicating means signal being added having a relative polarity with respect to the polarity of the other weight indicating means signals being added dependent upon the direction of the other masses from the axis; totalizing means; means connecting said weight indicating means to said totalizing means and adding the weight signals and obtaining a signal indicative of the total weight of the masses; indicator means; and means connecting said moment summing means and said totalizing means to said indicator means and providing an indication of the distance of the center of gravity of the masses from the axis.

20. Apparatus for measuring the difference between the actual center of gravity of a plurality of masses of weight and the desired center of gravity of a craft comprising, in combination: separate weight indicating means associated with each mass, each means deriving a signal indicative of the weight of the mass with which it is associated; moment summing means for an axis; means connecting said weight indicating means to said moment summing means and algebraically adding the weight signals and obtaining a signal indicative of the total moment of the masses; totalizing means; means connecting said weight indicating means to said totalizing means and adding the weight signals and obtaining a signal indicative of the total weight of the masses; indicator means; and means connecting said moment summing means and said totalizing means to said indicator means and providing an indication of the distance of the center of gravity of the masses from the axis.

References Cited in the file of this patent

UNITED STATES PATENTS

| | | |
|---|---|---|
| 2,443,098 | Dean | June 8, 1948 |
| 2,509,629 | DeGiers et al. | May 30, 1950 |
| 2,540,807 | Berry | Feb. 6, 1951 |
| 2,541,429 | Mathes et al. | Feb. 13, 1951 |
| 2,585,480 | Makhonine | Feb. 12, 1952 |
| 2,656,977 | Cummings | Oct. 27, 1953 |
| 2,672,880 | Hermanson | Mar. 23, 1954 |

FOREIGN PATENTS

| | | |
|---|---|---|
| 685,237 | Great Britain | Dec. 31, 1952 |